3,032,571
STABILIZED STANNOUS CARBOXYLATES
John R. Leebrick, Roselle Park, N.J., assignor to Metal & Thermit Corporation, Woodbridge Township, N.J., a corporation of New Jersey
No Drawing. Filed Nov. 30, 1959, Ser. No. 855,958
14 Claims. (Cl. 260—429.7)

The present invention is directed to stabilized stannous salts of carboxylic acids.

Stannous salts of carboxylic acids are used as catalysts in polyurethane foam production, and for curing silicones, as well as other purposes. These salts degrade when exposed to air, limiting their utility, especially where storage after initial opening of a container is required. As far as I know, there has been no known method of stabilizing the stannous salts of carboxylic acids to prevent degradation.

It is an object of this invention to provide a composition comprising stabilized stannous salts of aromatic and aliphatic carboxylic acids.

It is another object of this invention to provide a process for stabilizing stannous salts of aromatic and aliphatic carboxylic acids.

I have discovered that stabilized stannous salts of aromatic and aliphatic carboxylic acids are prepared by incorporating in the acid an amount of 4-tert-butyl catechol effective to prevent degradation. Although the 4-tert-butyl catechol remains in solution in amounts effective to stabilize the stannous salts at ambient temperature, it only dissolves at such temperature with difficulty. To prepare a solution, it is preferred to heat liquid stannous salts to about 80° C. and add the stabilizer, with agitation for a relatively long period of time, preferably at least 30 minutes. To prevent degradation when incorporating the stabilizer, an inert atmosphere should be provided; nitrogen, which is the most inexpensive, is satisfactory. The stannous salts which are solids at this temperature should be heated until molten and the stabilizer incorporated as specified hereinbefore.

The stannous salts of carboxylic acids as prepared commercially usually do not assay 100% stannous tin, e.g., commercial stannous octoate usually assaying between 95% and 99% $Sn^{++}$; and commercial stannous oleate usually assaying between 85% and 95% $Sn^{++}$. The percentages specified herein, and in the examples, are the ratio of the stannous tin present to the total tin content in the samples analyzed. 4-tert-butyl catechol is an extremely potent stabilizer to prevent degradation of the stannous salts of carboxylic acids. It if effective to give adequate protection for commercial usage in amounts as low as 0.02%, although inhibition of degradation is obtained in decreasing effectiveness with even more minute quantities. It is preferred that between 0.05% and 0.2% be used. It is not contemplated that more than about 1 or 2% will be used. Larger amounts may be incorporated without adversely affecting the properties of the stannous salts. All percentages specified herein are by weight. Cost considerations are not a large factor as the stabilizer and many of the salts have about the same value. The maximum amount of stabilizer that may be incorporated is determined in each case by the maximum solubility in the stannous salt as well as the difficulty attendant upon dissolving larger amounts of the stabilizer.

4-tert-butyl catechol is effective as a stabilizer to prevent degradation of the stannous salts of aromatic and aliphatic carboxylic acids. Illustrative of the compounds included in this class of salts are; stannous fumarate, stannous glycolate, stannous diglycolate, stannous 12-hydroxy stearate, stannous itaconate, stannous lactate, stannous levulinate, stannous linoleate, stannous malate, stannous maleate, stannous ricinoleate, stannous oleyl sarcosinate, stannous salicylate, stannous sebacate, stannous sorbate, stannous succinate, stannous thioglycolate, stannous versenate, stannous di(3,5,5-trimethylhexylate), stannous abietate, stannous acetate, stannous monochloroacetate, stannous trichloroacetate, stannous p-aminobenzoate, stannous benzoate, stannous butyrate, stannous caprate, stannous citrate, stannous caprylate, stannous cyanoacetate, stannous formate. The following are of the greatest commercial interest: stannous 2-ethylhexoate, stannous octoate, stannous oleate, stannous naphthanate, stannous gluconate, stannous stearate, stannous tartrate, stannous caproate, stannous myristate, stannous palmitate, stannous laurate and stannous oxalate.

For the purpose of giving those skilled in the art a better understanding of the invention, the following illustrative examples are given:

2 oz. jars were filled with samples of liquid stannous oleate and stannous octoate (2-ethylhexoate) to approximately the ¾ level, and then plugged with cotton. The solid material, stannous stearate, was pulverized to a fine power and spread in a thin layer in the open. The samples identified by the letter (a) are controls. The samples identified by the letters (b) and (c) were stabilized by the addition of the specified amount of 4-tert-butyl catechol. All samples were exposed to air and sunlight for six days and nights. The results are tabulated as follows:

| No. | Salt | Percent 4-tert-butyl catechol in salt | Before exposure percent $Sn^{++}$ [1] | After exposure percent $Sn^{++}$ [1] |
|---|---|---|---|---|
| 1 (a) | stannous 2-ethyl-hexoate | ------ | 95.5 | 83.0 |
| (b) | ----do---- | 0.05 | 95.5 | 93.5 |
| (c) | ----do---- | 0.1 | 95.5 | 94.5 |
| 2 (a) | ----do---- | ------ | 95.5 | 83 |
| (b) | ----do---- | 0.01 | 95.5 | 89 |
| (c) | ----do---- | 0.025 | 95.5 | 92.5 |
| 3 (a) | ----do---- | ------ | 99 | 87 |
| (b) | ----do---- | 0.05 | 99 | 98+ |
| 4 (a) | stannous oleate | ------ | 88.5 | 78.5 |
| (b) | ----do---- | 0.05 | 88.5 | 87.0 |
| (c) | ----do---- | 0.1 | 88.5 | 86.5 |
| 5 (a) | stannous stearate | ------ | 92.5 | 90 |
| (b) | ----do---- | 0.1 | 92.5 | 92 |

[1] The "percent $Sn^{++}$" is the percentage of total tin in the stannous state.

The examples note that 0.05%–0.1% of stabilizer prevents substantially all degradation after six days of exposure. The stannous salts are stabilized by preventing or substantially inhibiting degradation, dependent on the salt and level of addition of the stabilizer. These tests are extremely rigorous and represent conditions which are probably never attained in commercial practice. In commerce the material is stored in drums which are tightly closed, and even after a portion of the drum is used, the air present during the remaining storage is not the equivalent of six days direct exposure. 4-tert-butyl catechol is also useful to arrest further degradation of material which has already partially degraded. The problem of degradation is less severe with those salts that are solids at ambient temperature.

As many embodiments of this invention may be made without departing from the spirit and scope thereof, it is to be understood that the invention includes all such modifications and variations as come within the scope of the appended claims.

I claim:

1. The process of stabilizing stannous salts of aromatic and aliphatic carboxylic acids comprising incorporating in said salts an amount of 4-tert-butyl catechol sufficient to inhibit degradation and not exceeding 2%.

2. The process of stabilizing a salt selected from the class consisting of the stannous salts of aromatic carboxylic acids and aliphatic carboxylic acids comprising incorporating in said salt between 0.02% and 1% of 4-tert-butyl catechol.

3. The process of claim 2 in which between about 0.05% and 0.2% of 4-tert-butyl catechol is incorporated in said salt.

4. A stabilized salt selected from the class consisting of stabilized stannous salts of aromatic carboxylic acids and aliphatic carboxylic acids containing said salt and between 0.02% and .2% of 4-tert-butyl catechol.

5. The stabilized salt of claim 4 in which said salt is the stannous salt of a corboxylic acid normally liquid at room temperature.

6. A stabilized salt selected from the class consisting of stannous salts of aromatic carboxylic acids and aliphatic carboxylic acids containing 4-tert-butyl catechol in an amount between 0.05% and 0.15%.

7. The stabilized salt of claim 6 in which the salt is selected from the class consisting of stannous octoate; stannous oleate; stannous gluconate; stannous stearate; stannous naphthanate; stannous tartrate; stannous caproate; stannous myristate; stannous palmitate; stannous laurate; and stannous oxalate.

8. The stabilized salt of claim 6 in which the salt is stannous 2-ethylhexoate.

9. The stabilized salt of claim 6 in which the salt is stannous oleate.

10. The stabilized salt of claim 6 in which the salt is stannous gluconate.

11. The stabilized salt of claim 6 in which the salt is stannous stearate.

12. The stabilized salt of claim 6 in which the salt is stannous naphthanate.

13. The stabilized salt of claim 6 in which the salt is stannous tartrate.

14. The stabilized salt of claim 6 in which the salt is stannous caproate.

References Cited in the file of this patent
UNITED STATES PATENTS

| | | |
|---|---|---|
| 2,514,199 | Smith | July 4, 1950 |
| 2,573,294 | Ackerman et al. | Oct. 30, 1951 |
| 2,581,913 | Smith | Jan. 8, 1952 |
| 2,581,940 | Smith | Jan. 8, 1952 |